C. H. MUCKENHIRN.
METHOD AND APPARATUS FOR MAKING HOLLOW EARTHENWARE PARTS.
APPLICATION FILED MAR. 3, 1919.

1,332,514.

Patented Mar. 2, 1920.
6 SHEETS—SHEET 1.

Witnesses:
Jas E Hutchinson

Inventor:
Charles H. Muckenhirn
By Milans & Milans Attorneys

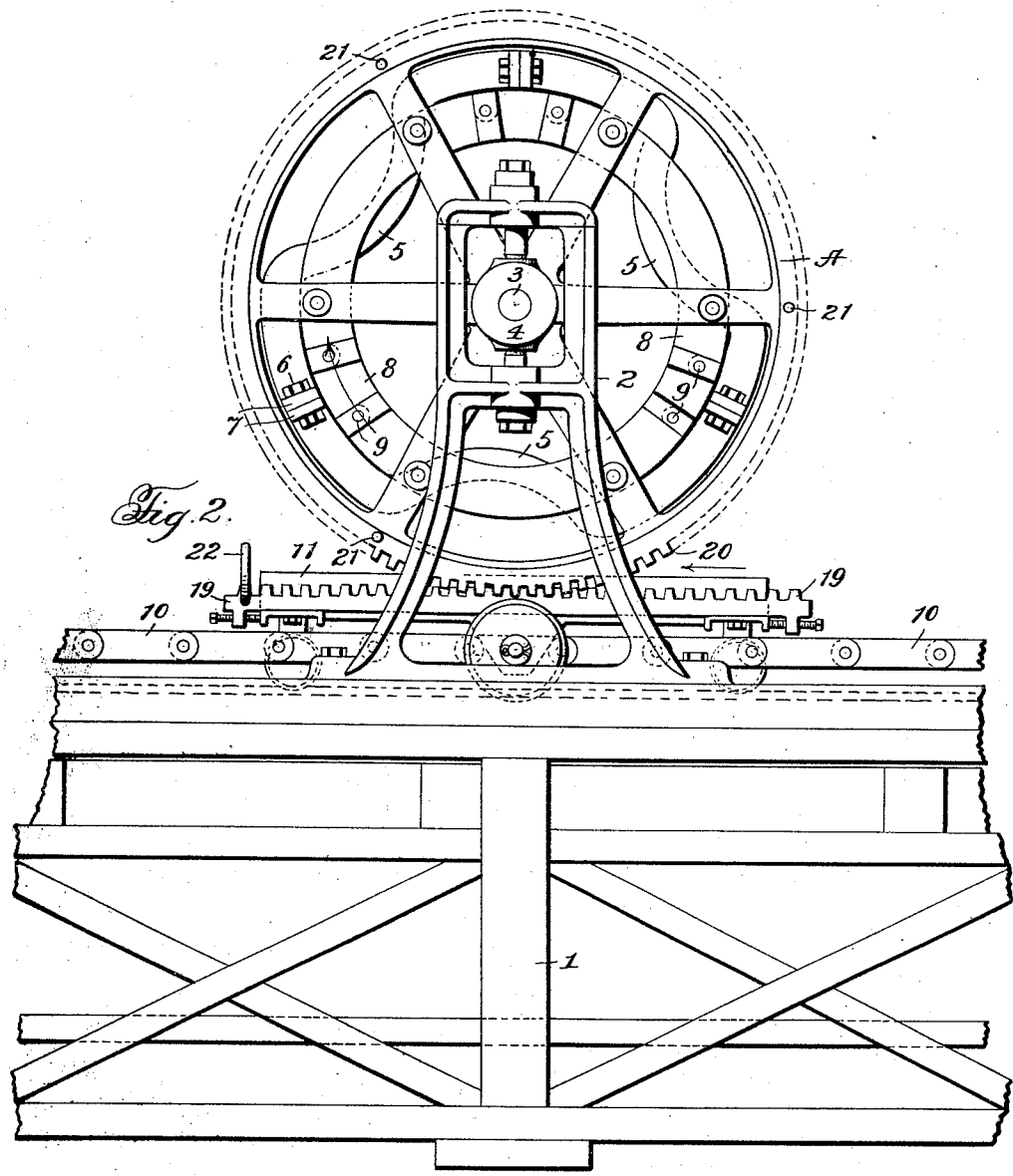

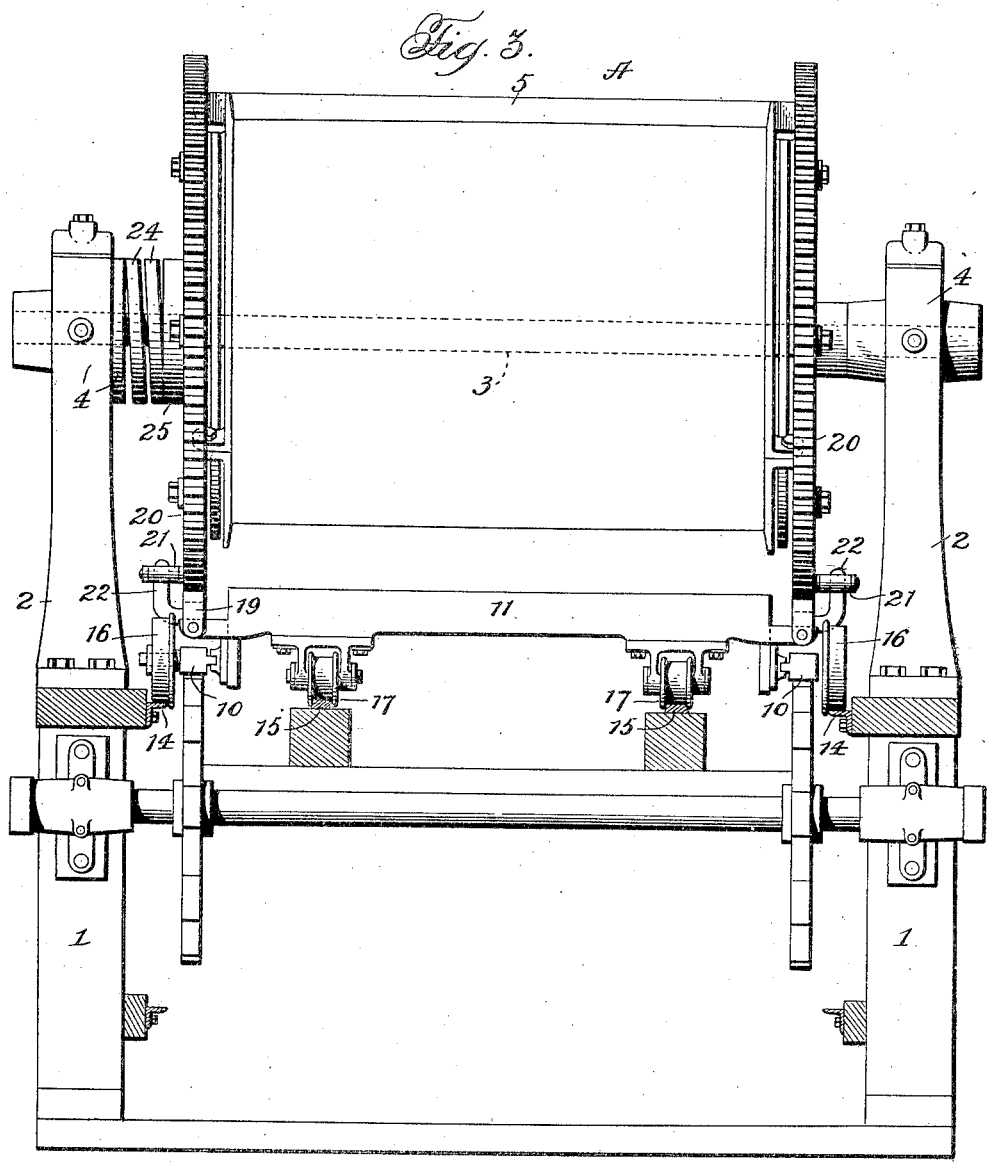

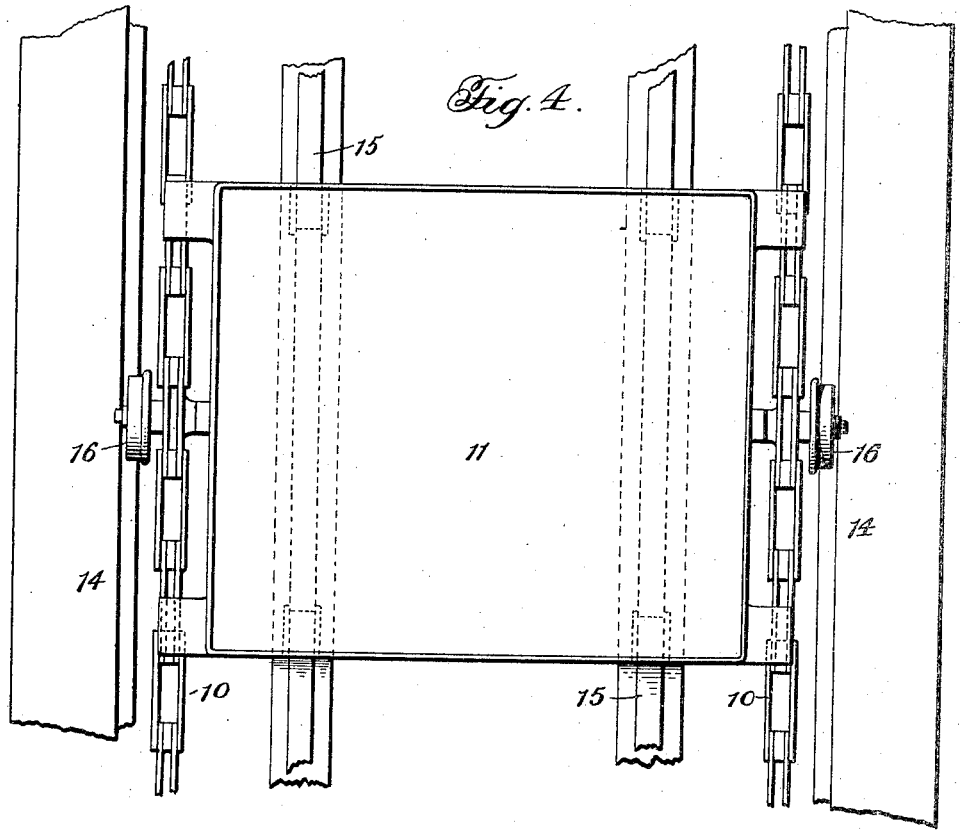
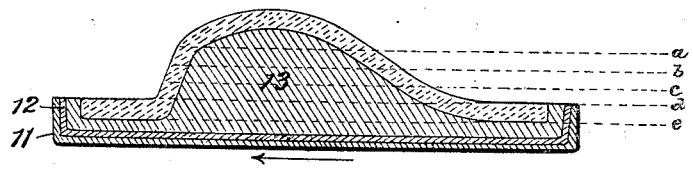

C. H. MUCKENHIRN.
METHOD AND APPARATUS FOR MAKING HOLLOW EARTHENWARE PARTS.
APPLICATION FILED MAR. 3, 1919.
1,332,514.
Patented Mar. 2, 1920.
6 SHEETS—SHEET 5.
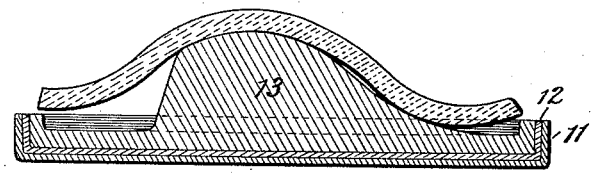
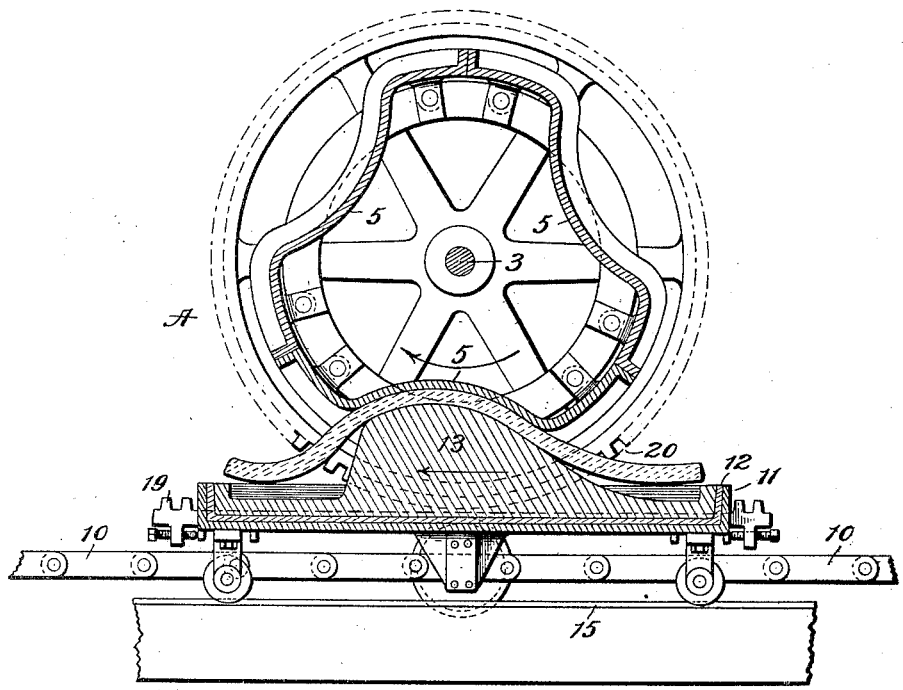

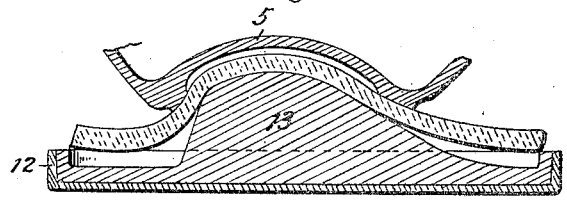
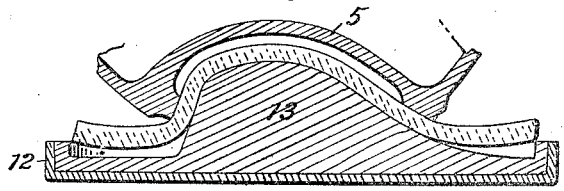
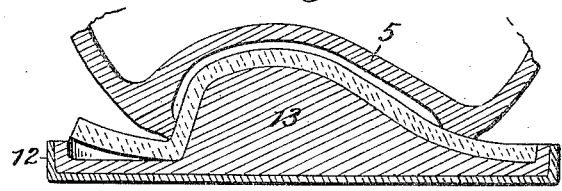
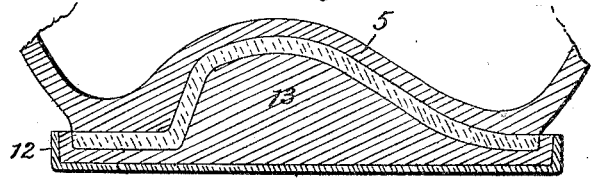

UNITED STATES PATENT OFFICE.

CHARLES H. MUCKENHIRN, OF DETROIT, MICHIGAN.

METHOD AND APPARATUS FOR MAKING HOLLOW EARTHENWARE PARTS.

1,332,514.   Specification of Letters Patent.   Patented Mar. 2, 1920.

Application filed March 3, 1919. Serial No. 280,277.

*To all whom it may concern:*

Be it known that I, CHARLES H. MUCKENHIRN, a citizen of the United States, residing at Detroit, in the county of Wayne and State of Michigan, have invented certain new and useful Improvements in Methods and Apparatus for Making Hollow Earthenware Parts, of which the following is a specification, reference being had therein to the accompanying drawing.

This invention relates to an improved method and apparatus for making hollow earthenware parts, especially sanitary ware.

In the manufacture of sanitary ware by what is known as the "pressing method" commonly followed, the work is performed entirely by hand. A slab of clay is laid inside of a mold, and the presser, with a cloth covered sponge presses and fits the clay to the mold, beginning at the bottom and central part of the mold and gradually working from this part upwardly along the sides of the mold to uniformly force the clay into accurate contact with the entire face of the mold. This starting of the pressing operation at the bottom and central part of the mold and then gradually working upward along the sides thereof provides for the proper escape of air and, as well recognized, is highly essential to the production of hollow earthenware that measures up to commercial requirements.

The object of the present invention is to provide an improved method and apparatus whereby the manufacture of hollow earthenware articles and parts by "pressing" can be performed by mechanical means in a manner analogous to and possessing all of the advantages of the hand method, resulting in a great reduction in the time and cost of production and a more uniform product than is possible by the laborious individual hand process.

The invention will be understood from the hereinafter contained detail description when considered in connection with the accompanying drawings, forming part hereof, and illustrating one form of apparatus for carrying out my improved method.

In the drawings:

Fig. 2 is a side elevation on an enlarged scale, of a portion of the endless carrier and two of the mold devices in operative relation.

Fig. 3 is an end elevation, on an enlarged scale, of two of the mold devices and adjacent parts.

Fig. 4 is a top plan view, on an enlarged scale, of a portion of the endless carrier and a set of the molding devices.

Fig. 5 is a detail longitudinal section of one of the patterns and a slab of clay thereon before being operated upon by the external molds.

Fig. 6 is a longitudinal section through two of the molding devices indicating the sections shaped by the first of the series of external molds.

Figure 1:
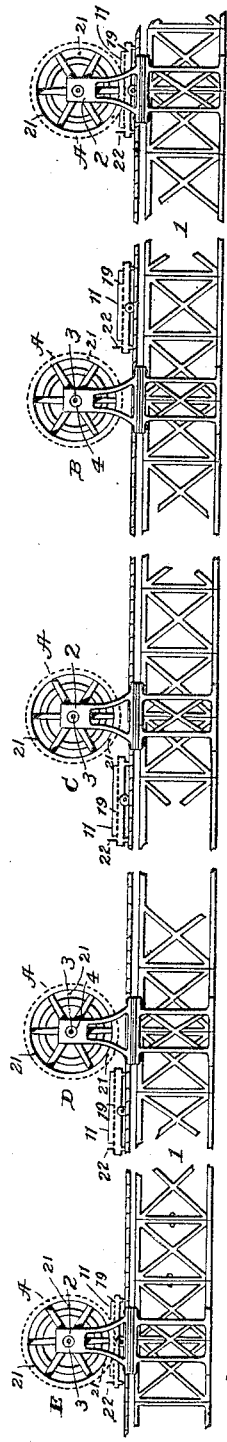
Figure 1 is a side elevation of an apparatus constructed in accordance with the present invention.

Figs. 7, 8, 9, and 10 are detail views illustrating respectively, in a general way, the contour of the second, third, fourth, and fifth external molds of the series.

Fig. 11 is a detail longitudinal section of one of the patterns showing a hollow part or article after the same has been acted upon by the entire series of molds, and indicating, in a general way, by dotted lines $a$, $b$, $c$, $d$, $e$, the sections of the hollow part shaped by the different matrices of the series.

According to my improved method for making hollow earthenware articles and parts, the article or part is gradually shaped in sections from a slab of clay by a succession of separate independent impressions between molding devices. In practising the method a slab of clay, prepared in the customary manner, is placed upon a pattern or external mold and subjected to a succession of impressions by a series of matrices, each impression extending over and being confined to a separate relatively small transverse section of the article or part to be shaped, and the impressions starting from the bottom of the part to be shaped and proceeding upwardly, step by step, along the sides thereof. The major portion of the article or part is formed in this way, each impression being confined to a separate section or area of the article or part. The part is completed by a final impression which shapes the remaining upper section of the part and extends over all of the previously shaped sections. This final impression, extending over the entire outer face of the article or part serves to flatten or smooth out any ridges or uneven or roughened portions between the sections separately shaped by the preceding impressions.

It will be noted that by my improved method the hollow article or part is shaped by pressing beginning at the bottom of the article or part and gradually working upward to permit the proper escape of air and to force the clay into accurate contact uniformly over the entire face of the mold, identically with the hand process, except that the impressions are applied externally instead of internally.

As will be readily appreciated, the method hereinbefore described, greatly reduces the time and cost of production and results in a more uniform product. Complete hollow clay articles of all descriptions can be advantageously made by the method, and the same is especially advantageous in the manufacture of sanitary ware which is composed of relative large pieces, that are in turn built up of numerous small parts joined in a whole, because the accurate character of the parts produced by mechanical means in accordance with my improved method makes possible the use of what is known as "a slip or liquid" to make the joints in connecting the parts together, entirely avoiding the necessity of the soft clay roll joint. This is of considerable practical importance as the joints made by means of a "slip or liquid" are, as well known, far preferable and will, to a greater extent than is possible with the clay roll joint, make the completed article homogeneous.

The apparatus illustrated in the drawing for carrying out my improved method includes a series of rotatable molding devices arranged in a row, and a mold part, upon which the clay is placed, movable in a straight path along the row of rotatable molding devices at the under side thereof, together with means for rotating the respective rotatable molds as the other mold part reaches the same, said means acting to turn the rotatable molds in proper timed relation with the rectilinear movement of the other mold part to coöperate therewith in molding the clay.

Referring to a detail description of the drawings, wherein like reference characters designate corresponding parts throughout the several views, 1 designates the frame of the machine having at intervals along the same pairs of vertical standards 2 upon which are mounted the series of rotatable molding devices A, B, C, D, E, each of the rotatable molding devices being of the general construction of a cylinder or drum provided with an axle 3 to which it is fixedly secured, and which is rotatably mounted in bearings 4 carried at the upper ends of one of the pairs of standards 2. Each rotatable molding device is shown provided with three matrices 5, which are conveniently formed as separate parts, the drum or cylinder in each instance consisting of the three matrices 5 secured together by bolts 6 engaging flanges 7, and heads 8 secured to the ends of the matrices by bolts 9.

Mounted on the frame 1 is an endless conveyer 10 provided at intervals with suitable rectangular shaped frames 11 to receive boxes 12 which contain the patterns or internal mold members 13. The frame 1 is provided with outer rails 14 and inner tracks 15 engaged respectively by rollers 16 at the sides of the conveyer, and wheels 17 on the frames 11, whereby a firm support is provided for the patterns or internal mold members 12 during their movement beneath and while the rotatable molding devices are coöperating therewith.

In the drawings, the patterns 13 are shown of a shape to form a lavatory basin, the patterns being shaped to correspond to the interior face of the completed article or piece. A series of the matrices 5 of the several drums or rotatable molding devices acting successively with one of the patterns 13 are adapted to shape the hollow article or piece step by step, beginning from the bottom thereof, the internal contour of the matrices 5 of each rotatable molding device of the series being the same in shape and one of the matrices 5 of each rotatable molding device coöperating with one of the patterns 13 during the travel of the latter beneath the series of the rotatable molding devices. The matrices 5 of the rotatable molding devices A, B, C, and D are constructed to act over separate transverse sections of the piece to be shaped. In Fig. 5 of the drawings is indicated the position of a slab of clay on one of the patterns 13 before the same has been operated upon by any of the rotatable mold devices. In Fig. 6 of the drawings is indicated one of the patterns in coöperative relation with one of the matrices 5 of the first rotatable molding device A, the matrix acting over a lower bottom section of the article to be shaped. Figs. 7, 8, and 9 of the drawings illustrate in a general way the structure of and the transverse section of the article or piece acted upon respectively by the matrices of the rotating mold members B, C and D, it being understood that the matrices of the rotating mold devices B, C, D, act over certain transverse sections or areas of the article to be shaped without affecting the sections or areas of the part previously formed by the matrices of the other rotating mold devices. The showing in the drawings of the matrix structures B, C, and D whereby they do not act upon the previously formed sections has been somewhat exaggerated over what they will be in actual practice but this has been done with a view of more clearly illustrating the idea. The matrices 5 of the last of the series of the rotating molds E shapes the remaining upper section of the hollow article or part and also extends over all of the other transversely shaped sections, acting to flatten or smooth out any ridges or uneven roughened portions between the previously shaped sections. In Fig. 11 of the drawings is indicated the general shape of the matrices of the last of the series of rotating mold devices E.

The means illustrated in the drawings, for rotating the respective rotatable mold devices to turn the same in proper timed relation with the rectilinear movement of the patterns as they pass along the same, and providing for presentation of one of the matrices of each rotatable molding device to the patterns comprises rack bars 19 on the ends of the frames 11, gears 20 on the heads 8 of the rotatable drums or molding devices to coöperate with the rack bars 19, studs 21 on the heads of the rotatable molding devices and vertically extending arms or projections 22 at the forward end of the frames 11 to coöperate with the studs 21. The construction and arrangement of these parts is such that when the conveyer 10 is driven in the direction of the arrow, and the patterns pass beneath the series of rotatable molding devices, the arms 22 at the forward end of the frames 11 will engage one of the roller studs 21 on the heads 8, and bring one set of gear segments 20 of the heads 8 into mesh with the racks 19 of the frames 11. Means is provided for stopping the movement of the rotatable molds after the same has finished its pressing operation. Any suitable means may be provided for this purpose, that illustrated in the drawings consisting of spring washers 24 interposed between hub parts 25 of the rotatable molding devices, and the inner face of one of the bearings 4.

Any convenient means, not shown, may be employed to operate the conveyer, and to place the slabs of clay on the patterns 13, and to remove the finished product therefrom.

In the drawings, five rotatable molding devices have been shown as comprising the series of rotatable molds, the matrices of each of the molding devices being constructed to shape substantially one fifth of the hollow article or part. It will be understood, however, that the showing in the drawings, in these particulars, is merely by way of example, that the number of rotatable molding devices, the number of matrices of each rotatable mold, and the construction of the matrices to operate over different sized sections of the article to be produced, will vary as found convenient in making articles of different shapes and sizes, and that the apparatus may be modified and changed in many ways without departing from the broad principles of the invention.

What I claim is:

1. The method of making hollow earthenware parts consisting in shaping the same from a slab of clay gradually in sections by a succession of independent impressions between mold members.

2. The method of contouring a slab of clay, comprising subjecting said slab in successive areas thereof to the action of shaping members, the treatment of said areas being from the center to the outer portions of the slab.

3. The method of making hollow earthenware parts consisting in shaping the same from a slab of clay gradually in sections by a succession of independent exteriorly applied impressions.

4. The method of making hollow earthenware parts consisting in shaping the same from a slab of clay gradually in transverse sections, beginning at the bottom of the piece to be shaped and working upwardly, by a succession of independent impressions between mold members.

5. The method of making hollow earthenware parts consisting in shaping the same from a slab of clay gradually in transverse sections, beginning at the bottom of the piece to be shaped and working upwardly, by a succession of independent impressions between mold members, and subjecting the sections so produced to a final single finishing impression common to all.

6. The method of making hollow earthenware parts consisting in shaping the same from a slab of clay gradually in sections by a succession of independent impressions between the mold members, and subjecting the sections so shaped to a final finishing impression common to all.

7. The method of making hollow earthenware parts consisting in shaping the same from a slab of clay gradually in transverse sections, beginning at the bottom of the piece to be shaped and working upwardly for a greater part of the piece by a succession of separate independent impressions between mold members, and a final finishing impression shaping the last section of the piece to be formed and extending over all of the sections previously shaped.

8. In an apparatus for molding hollow eartherware parts, the combination including a mold part to receive the clay, and a series of complemental mold parts to coöperate independently of each other and in succession with the first mentioned mold part to shape the hollow part in sections step by step, and operating means for the mold parts.

9. In an apparatus for molding hollow earthenware parts, the combination including a pattern or internal mold part to receive the clay, and a series of complemental molds to coöperate independently of each other and in succession with the first mentioned mold part to shape the hollow part in sections step by step, and operating means for the mold parts.

10. In an apparatus for molding hollow earthenware parts, the combination including a mold part to receive the clay, and a series of complemental mold members to coöperate independently of each other and in succession with the first mentioned mold part to shape the hollow part in sections step by step, the complemental mold parts being formed to act over separate areas of the part to be shaped, and operating means for the mold parts.

11. In an apparatus for molding hollow earthenware parts, the combination including a mold part to receive the clay, a series of complemental mold parts to coöperate independently of each other and in succession with the first mentioned mold part to shape the hollow part in sections step by step, the complemental mold parts being formed to act over separate transverse sections of the part to be shaped beginning at the bottom thereof and gradually working upwardly therefrom.

12. In an apparatus for molding hollow earthenware parts, the combination including a mold to receive the clay, a series of complemental mold parts to coöperate independently of each other and in succession with the first mentioned mold part to shape the hollow part in sections step by step, each complemental mold part except the last of the series being formed to act over a separate transverse section of the part to be shaped, and the last of the series of complemental mold parts being constructed to shape the last transverse section of the part and also to give a final impression to the transversely shaped sections.

13. In an apparatus for molding hollow earthenware parts, the combination of a pattern or internal mold to receive the clay, of a series of complemental rotatable matrices or external molds to coöperate independently of each other and in succession with the internal mold to shape separate sections of the hollow part beginning at the bottom thereof and gradually working upward, means for supporting and moving the pattern in a rectilinear path along and adjacent to the series of rotatable molds, and means for rotating the rotatable molds in proper timed relation with the rectilinear movement of the external mold to coöperate therewith.

14. In an apparatus for molding hollow earthenware parts, the combination of a plurality of patterns or internal molds to receive the clay, a series of complemental rotatable molds each adapted to shape separate transverse sections of the hollow part to be formed beginning at the bottom thereof and working upwardly, an endless carrier for supporting and moving the pattern molds in a rectilinear path adjacent the rotatable molds, operating means for the carrier, and means for rotating the rotatable molds in proper timed relation with the rectilinear movement of the external molds to coöperate therewith.

In testimony whereof I hereunto affix my signature in the presence of two witnesses.

CHARLES H. MUCKENHIRN.

Witnesses:
 GERTRUDE WEDEMEIER,
 GEORGE D. RILEY.